(12) United States Patent
Woods, II et al.

(10) Patent No.: US 9,091,018 B2
(45) Date of Patent: Jul. 28, 2015

(54) METHOD OF FORMING A STITCHED MULTI-LAYER FABRIC

(71) Applicant: SWNR Development, LLC, Pagosa Springs, CO (US)

(72) Inventors: William Thomas Woods, II, Lantana, TX (US); Douglas Stanley Lumb, Methuen, MA (US); Daniel L. English, Pagosa Springs, CO (US)

(73) Assignee: SWNR Development, LLC, Pagosa Springs, CO (US)

( * ) Notice: Subject to any disclaimer, the term of this patent is extended or adjusted under 35 U.S.C. 154(b) by 9 days.

(21) Appl. No.: 14/067,340

(22) Filed: Oct. 30, 2013

(65) Prior Publication Data

US 2014/0053969 A1 Feb. 27, 2014

Related U.S. Application Data

(62) Division of application No. 13/435,854, filed on Mar. 30, 2012, now Pat. No. 8,597,760.

(51) Int. Cl.
| | |
|---|---|
| *B32B 7/08* | (2006.01) |
| *B29C 65/00* | (2006.01) |
| *B32B 37/00* | (2006.01) |
| *C08J 5/00* | (2006.01) |
| *C09J 7/00* | (2006.01) |
| *B32B 3/06* | (2006.01) |
| *B32B 9/00* | (2006.01) |
| *D06M 17/10* | (2006.01) |
| *B32B 5/06* | (2006.01) |

(Continued)

(52) U.S. Cl.
CPC ............... *D06M 17/10* (2013.01); *B32B 5/06* (2013.01); *B29C 65/02* (2013.01); *B29C 65/4815* (2013.01); *B29C 65/62* (2013.01); *B29C 65/72* (2013.01); *B32B 7/08* (2013.01); *B32B 27/12* (2013.01); *B32B 37/04* (2013.01); *B32B 2037/1223* (2013.01); *Y10T 428/24033* (2015.01)

(58) Field of Classification Search
CPC ........ B29C 65/00; B29C 65/02; B29C 65/40; B29C 65/48; B29C 65/4815; B29C 65/64; B29C 65/72; B29C 65/5057; A41D 31/02; A41D 31/0038; B32B 27/12; B32B 7/08; B32B 37/00; B32B 37/04; B32B 2037/1215; B32B 2037/1223
USPC ............. 156/60, 87, 90, 91, 92, 93, 242, 246, 156/308.2, 308.4, 309.6, 313, 324; 428/98, 428/102, 103, 104; 112/400, 402, 440
See application file for complete search history.

(56) References Cited

U.S. PATENT DOCUMENTS

| | | |
|---|---|---|
| 891,594 A | 6/1908 | Cornely |
| 2,372,632 A | 3/1945 | Webb |

(Continued)

*Primary Examiner* — Philip Tucker
*Assistant Examiner* — Brian R Slawski
(74) *Attorney, Agent, or Firm* — Conley Rose, P.C.; William H. Dietrich

(57) ABSTRACT

Methods of forming a stitched multi-layer fabric are provided. An embodiment method includes stitching an interior layer to a barrier layer, the interior layer comprising a first non-waterproof fabric and the barrier layer configured to inhibit fluid flow, disposing a face layer over the barrier layer without contacting the interior layer, the face layer comprising a second non-waterproof fabric, and melting a portion of the barrier layer to bond the face layer to the barrier layer and to fill stitch holes formed in the barrier layer during the stitching.

19 Claims, 6 Drawing Sheets

(51) Int. Cl.
  *B29C 65/02* (2006.01)
  *B29C 65/48* (2006.01)
  *B29C 65/62* (2006.01)
  *B29C 65/72* (2006.01)
  *B32B 27/12* (2006.01)
  *B32B 37/04* (2006.01)
  *B32B 37/12* (2006.01)

(56) References Cited

U.S. PATENT DOCUMENTS

| | | | |
|---|---|---|---|
| 3,352,739 A * | 11/1967 | Blue | 442/372 |
| 3,642,561 A * | 2/1972 | Grobner | 428/102 |
| 4,604,152 A | 8/1986 | Liukko | |
| 5,003,902 A * | 4/1991 | Benstock et al. | 112/418 |
| 5,065,599 A * | 11/1991 | Groshens | 66/84 A |
| 5,935,878 A * | 8/1999 | Glasser | 442/30 |
| 6,797,352 B2 | 9/2004 | Fowler | |
| 2008/0047654 A1* | 2/2008 | Sadato et al. | 156/91 |
| 2009/0075019 A1* | 3/2009 | Loos | 428/102 |
| 2013/0255555 A1 | 10/2013 | Woods | |
| 2014/0134391 A1 | 5/2014 | Lumb | |

* cited by examiner

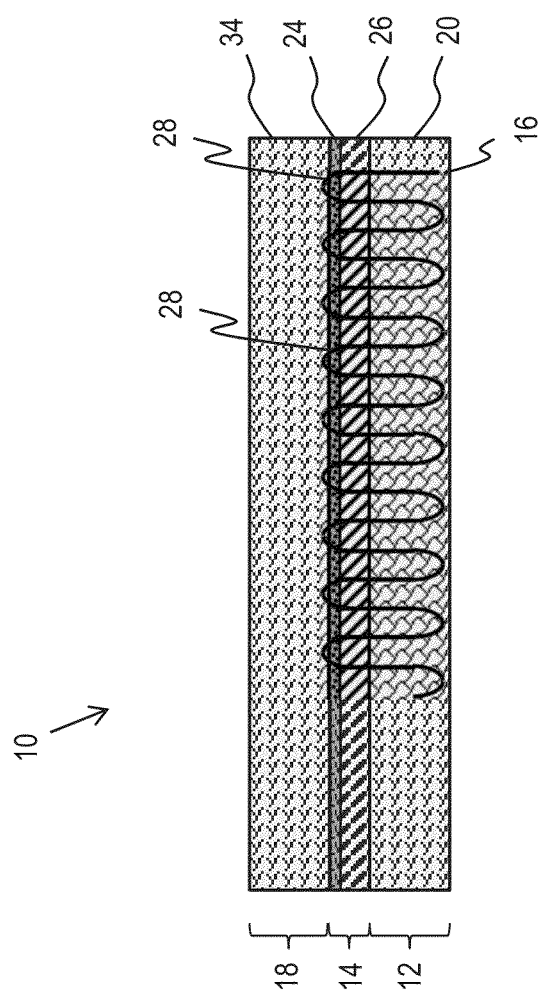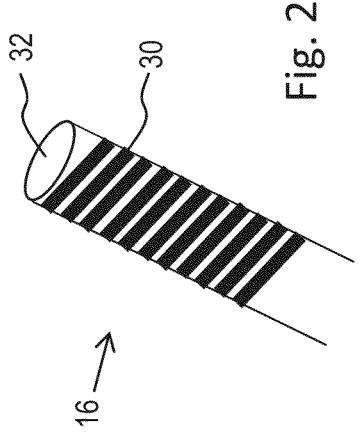

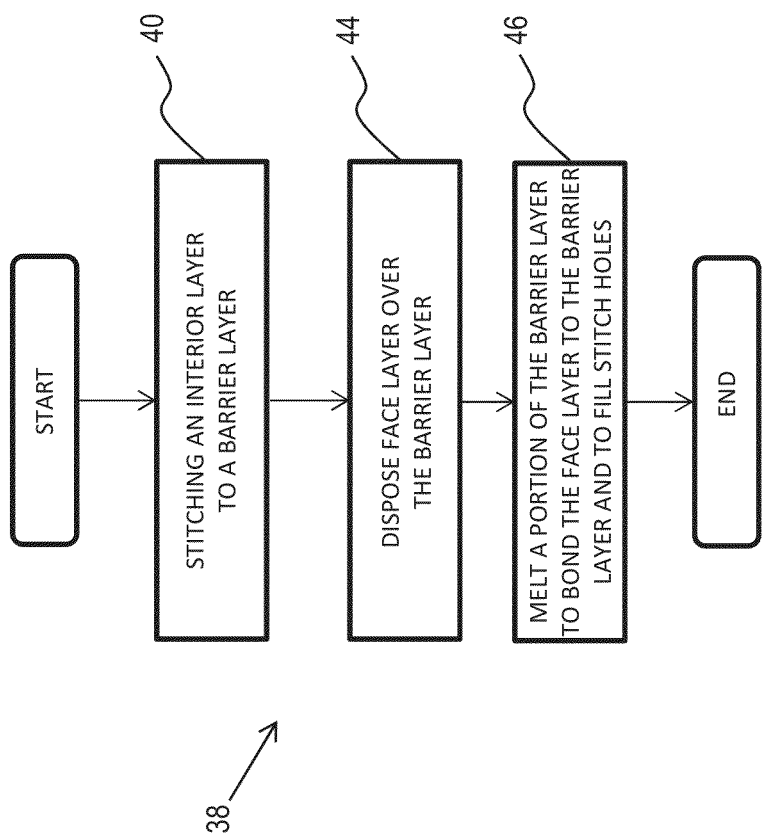

METHOD OF FORMING A STITCHED MULTI-LAYER FABRIC

CROSS-REFERENCE TO RELATED APPLICATIONS

This application is a divisional of U.S. patent application Ser. No. 13/435,854, filed on Mar. 30, 2012, now U.S. Pat. No. 8,597,760 entitled "Stitched Multi-Layer Fabric," which application is hereby incorporated herein by reference.

BACKGROUND

Textile manufacturers, garment makers, and others in similar industries have a continuing goal of creating or making available to consumers the most comfortable product for the intended end use.

Several factors, either alone or in combination, may affect the overall comfort of a particular product. These factors may include, but are not limited to, whether or to what extent the product is air permeable, breathable, water resistant or waterproof, or stretchable.

In an attempt to provide or maximize these qualities, the product may be manufactured using certain fabrics. The fabrics may be chosen for their inherent qualities (e.g., naturally breathable, etc.) or may be amenable to certain processes (e.g., waterproofing, etc.) so they will improve the comfort of the finished product.

Despite the above, making or providing a product that performs well in each category of permeability, breathability, water resistance, and stretch and, therefore, provides a high level of comfort, has proven to be a challenge.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 1 is a cross section of an embodiment of a stitched multi-layer fabric having a barrier layer formed from and adhesive and a membrane or a film;

FIG. 2 is a perspective view of an embodiment yarn used in the fabric of FIG. 1;

FIG. 8 is an embodiment of a method of forming the stitched multi-layer fabric of FIG. 1;

DETAILED DESCRIPTION OF ILLUSTRATIVE EMBODIMENTS

Figure 3:
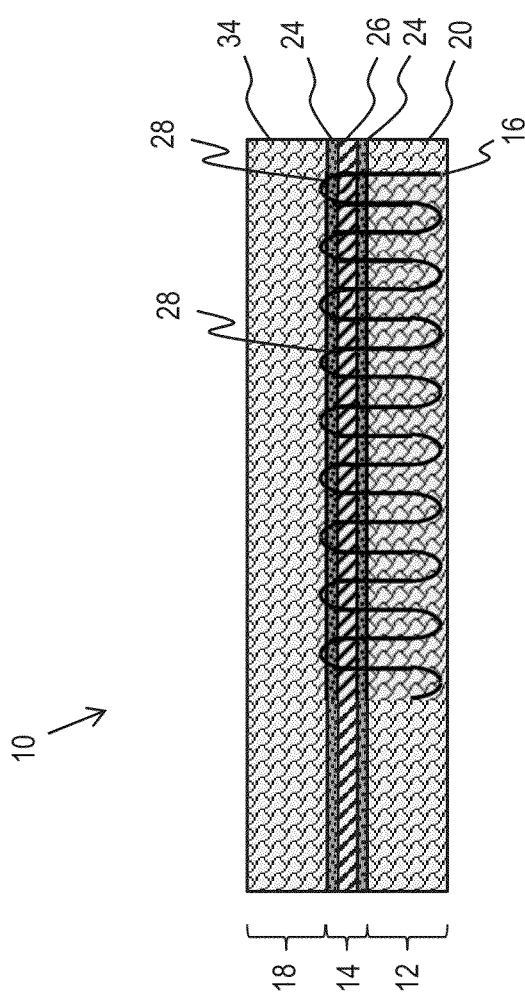
FIG. 3 is a cross section of an embodiment of the stitched multi-layer fabric of FIG. 1 where the barrier layer includes adhesive on opposing sides of the membrane or the film.

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative and do not limit the scope of the disclosure.

Referring to FIG. 1, an embodiment stitched fabric 10 is illustrated. As will be more fully explained below, the fabric 10 provides good breathability, water and wind resistance, and stretch. Therefore, the fabric 10 may have a variety of suitable uses (e.g., in a garment suitable for outdoor use, in a medical bandage, in a blanket for people or animals, etc.). In those instances where used in a garment, the fabric 10 provides a high level of comfort for the wearer. As shown in FIG. 1, the fabric 10 generally includes an interior layer 12, a barrier layer 14, a yarn 16, and a face layer 18.

The interior layer 12 is a knitted, woven, or non-woven fabric 20 formed using natural fibers (e.g., cotton, wool, silk, linen, etc.), synthetic fibers (e.g., nylon, polyester, etc.), or a blend of natural and synthetic fibers. In an embodiment, the interior layer 12 is a light-weight, durable, machine-washable fabric 20 with multi-direction stretch and good hand (e.g., feel). In an embodiment, the interior layer 12 provides horizontal and vertical stretch of thirty percent (30%) or more. In an embodiment, the interior layer 12 provides horizontal and vertical stretch of fifteen percent (15%) or more. When used in a garment, the interior layer 12 is generally oriented to engage or face toward the wearer.

Still referring to FIG. 1, the barrier layer 14 is configured to inhibit fluid flow. In other words, the barrier layer 14 is generally water resistant or waterproof. Therefore, the barrier layer 14 functions to discourage fluid flow through the fabric 10. In addition, in an embodiment the barrier layer 14 is also windproof, yet still permits the fabric 10 to be breathable. In other words, the barrier layer 14 is able to block wind from undesirably passing through the fabric 10 while still permitting moisture vapor generated by, for example, body heat to be dissipated. In an embodiment, the barrier layer 14 is stretchable or suitably elastomeric in order to compliment the degree of stretch afforded by the interior layer 12 and the face layer 18.

In an embodiment, the barrier layer 14 comprises an adhesive 24 and an intermediate material 26 (e.g., a porous membrane or a non-porous film) as shown in FIG. 1. In an embodiment, the barrier layer 14 may include several adhesive 24 layers and/or several intermediate layers 26.

A melting point of the adhesive 24 is generally lower than a melting point of the intermediate material 26. Therefore, the adhesive 24 may be melted without also melting the intermediate material 26. In other words, the adhesive 24 may be forced to flow through the application of sufficient heat without flowing, or compromising the integrity of, the intermediate material 26.

In an embodiment, the melting point of the adhesive 24 may be between about 140° C. to about 180° C. (about 284° F. to about 356° F.) while the melting point of the intermediate material 26 exceeds about 180° C. (about 356° F.). Where the adhesive 24 and the intermediate material 26 have different distinct melting points as noted above, the barrier layer 14 may be referred to as having an "A-B" type format. In an embodiment, the adhesive 24 is approximately two thousandths of an inch (i.e., 2 mils) and the intermediate material 26 is approximately one thousandth of an inch (i.e., 1 mil).

In general, the adhesive 24 is a thermoplastic, copolyamide, or other suitably meltable type of material capable of bonding two layers of fabric together. A variety of different adhesives 24 may be used in the barrier layer 14. By way of example, the adhesive 24 may be a high-quality textile adhesive such a polyurethane adhesive film, an ethylene-vinyl acetate, and the like. In an embodiment, the adhesive 24 may be heat sensitive, pressure sensitive, or both.

The intermediate material 26 of the barrier layer 14 may be either a membrane or a film formed from a variety of different materials. In an embodiment, the intermediate material 26 is formed from polyurethane, polyester, urethane, polyether, polytetrafluoroethylene (PTFE), or another polymer-based material. The intermediate material 26 may be manufactured using, for example, an extrusion, a melt blowing, or an electrospinning process.

As shown in FIG. 1, the interior layer 12 and the barrier layer 14 are stitched together with the yarn 16. As such, the yarn 16 secures the interior layer 12 and barrier layer 14 together. In an embodiment the yarn 16 is non-contractible. As shown in FIG. 2, in another embodiment the yarn 16 is contractible. In such an embodiment, the yarn 16 may be formed by wrapping nylon 30 around spandex 32 (e.g., Lycra®, elastane, etc.). A conventional covering process may be employed to perform the wrapping process. In another embodiment, materials other than nylon 30 and spandex 32 may be used.

In an embodiment, the yarn 16 has approximately seventeen turns per inch (17 TPI) (i.e., the nylon 30 is wrapped around the spandex 32 approximately seventeen times every inch). In an embodiment, the nylon 30 is wrapped around the spandex 32 while the spandex has a draft of approximately two and a half times (i.e., the spandex 32 has been stretched to two and a half times its original length). In an embodiment, the spandex 32 is a forty (40) denier fiber.

During the stitching process, the yarn 16 forms stitch holes 28 through the interior layer 12 and the barrier layer 14 as shown in FIG. 1. As will be more fully explained below, some or all of the stitch holes 28 are partially or fully filled when the barrier layer 14 is sufficiently heated. For example, the adhesive 24 of the barrier layer 14 may be heated to a thermoplastic state, which allows a portion of the adhesive to flow and plug a portion of the stitch holes 28 in the barrier layer 14.

The face layer 18 is a knitted, woven, or non-woven fabric 34 formed using natural fibers (e.g., cotton, wool, silk, linen, etc.), synthetic fibers (e.g., nylon, polyester, etc.), or a blend of natural and synthetic fibers. In an embodiment, the face layer 18 is a light-weight, durable, machine-washable fabric 34 with multi-direction stretch and good hand (e.g., feel). In an embodiment, the face layer 18 provides horizontal and vertical stretch of thirty percent (30%) or more. In an embodiment, the face layer 18 provides horizontal and vertical stretch of between about fifteen percent (15%) and about forty-five percent (45%). When used in a garment, the face layer 18 generally faces away from the wearer. In an embodiment, the face layer 18 and the interior layer 12 are formed from the same or a substantially similar fabric. In another embodiment, the face layer 18 and the interior layer 12 are formed from different types of fabric.

Referring now to FIG. 3, in an embodiment the barrier layer 14 of the fabric 10 may include an additional layer of the adhesive 24. As shown, the adhesive 24 is disposed on opposing sides of the intermediate material 26. Therefore, when the adhesive 24 is sufficiently heated the barrier layer 14 is bonded to both the interior layer 12 and the face layer 18. In addition, the adhesive 24 flows and fills a portion of the stitch holes 28 in the barrier layer 14 and the interior layer 12. In an embodiment, the adhesive 24 found on either side of the intermediate material 26 is the same type and, as such, has the same melting point. In FIG. 3, the barrier layer 14 may be referred to as having an "A-B-A" type format.

Figure 4:
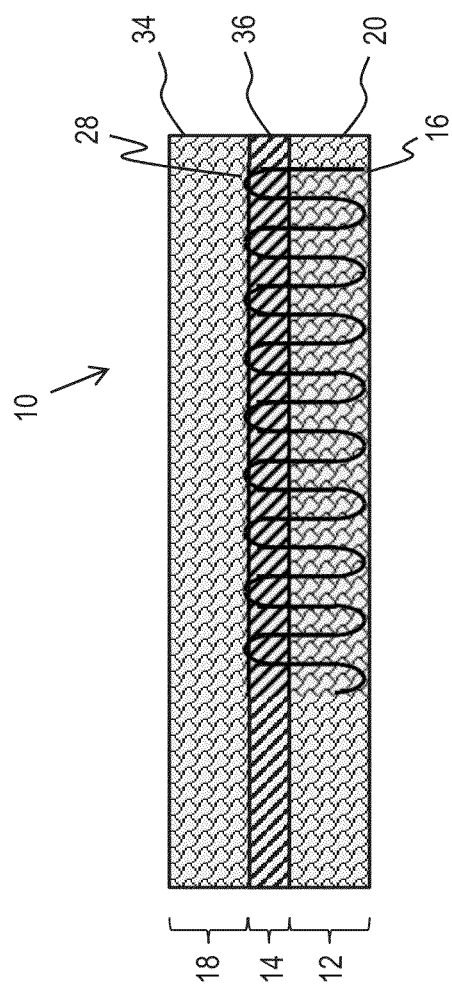
FIG. 4 is a cross section of an embodiment of the stitched multi-layer fabric of FIG. 1 where the barrier layer is formed solely from a meltable water-resistant film.

Referring now to FIG. 4, in an embodiment the barrier layer 14 of the fabric 10 is formed from an adhesive film 36 (e.g., a polymer-based adhesive film). In such an embodiment, the barrier layer 14 is formed from a single material. When the adhesive film 36 is sufficiently heated, upper and lower portions of the adhesive film 36 (i.e., portions adjacent the face layer 18 and the interior layer 12) melt and fill a portion of the stitch holes 28. In an embodiment, the adhesive film 36 is stretchable to a degree corresponding to the stretch provide by the interior layer 12 and the face layer 18.

Figure 5:
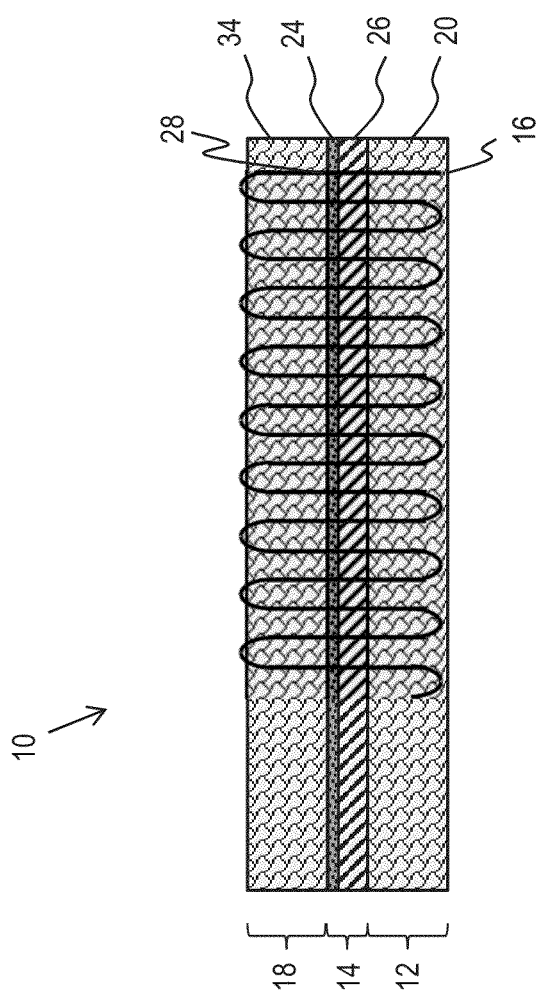
FIG. 5 is a cross section of an embodiment of the stitched multi-layer fabric of FIG. 1 where the yarn has been stitched through each of the layers.
Figure 6:
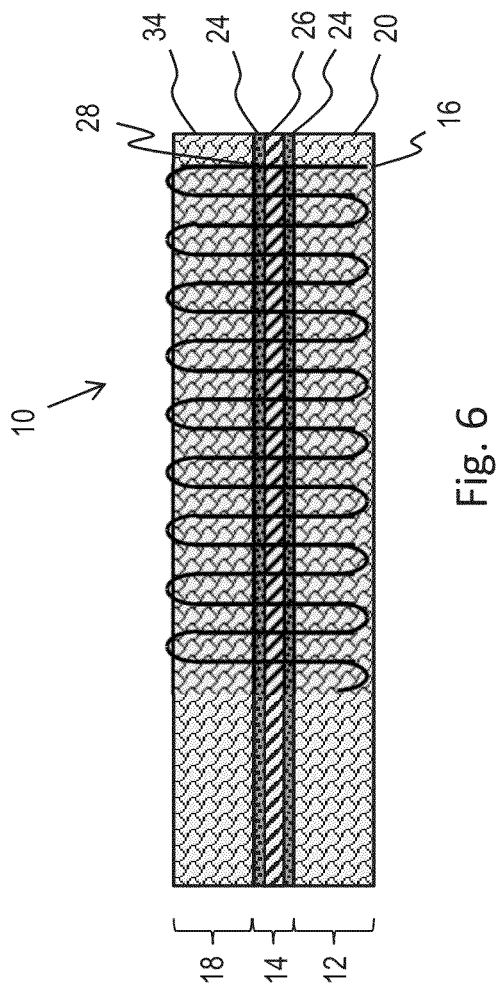
FIG. 6 is a cross section of an embodiment of the stitched multi-layer fabric of FIG. 3 where the yarn has been stitched through each layer.
Figure 7:
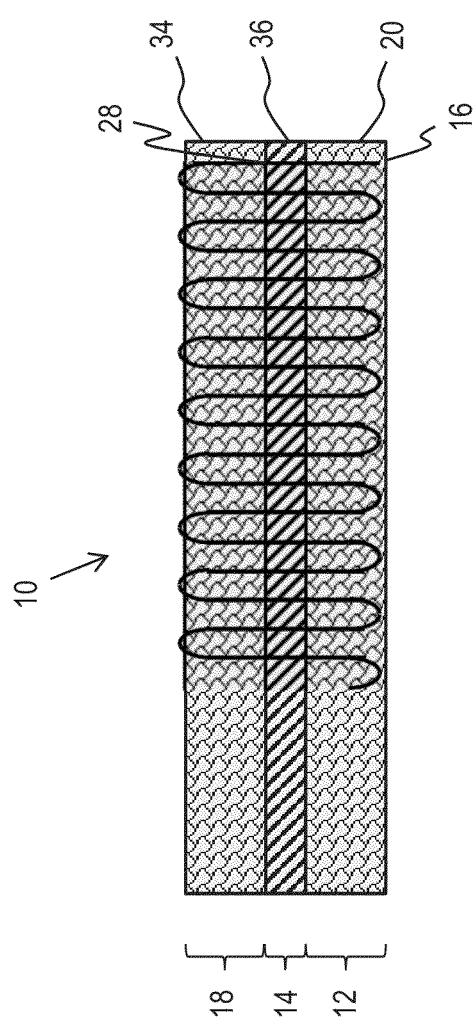
FIG. 7 is a cross section of an embodiment of the stitched multi-layer fabric of FIG. 4 where the yarn has been stitched through each layer.

Moving on to FIG. 5, in an embodiment the yarn 16 is stitched through each of the interior layer 12, the barrier layer 14, and the face layer 18. In addition, a barrier layer 14 comprising an intermediate material 26 (e.g., a porous membrane or a non-porous film) and an adhesive 24. As shown in FIG. 6, the yarn 16 is again stitched through all three of the layers 12, 14, 18. However, the barrier layer 14 includes the intermediate material 26 disposed between two layers of the adhesive 24. As shown in FIG. 7, a single material (e.g., adhesive film 36) is used for the barrier layer 14 while the yarn 16 is stitched through the layers 12, 14, 18.

Figure 9:
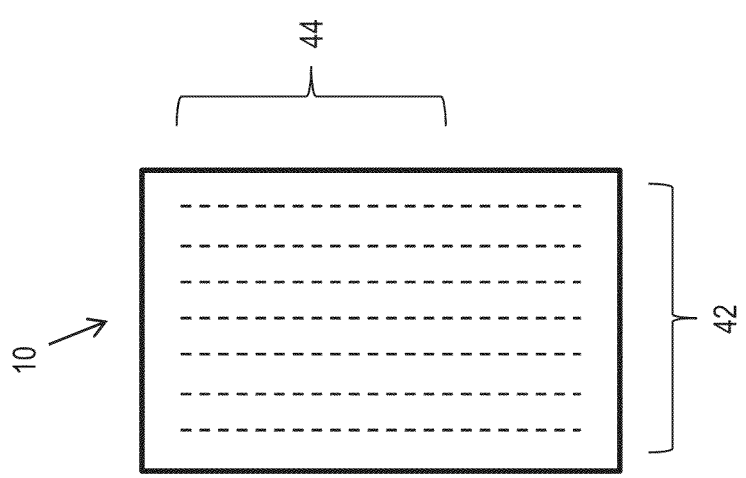
FIG. 9 is an embodiment of a stitch pattern for the stitched multi-layer fabric of FIG. 1.

In FIG. 8, a method 38 of forming the stitched multi-layer fabric 10 is illustrated. In block 40, the interior layer 12 is stitched to the barrier layer 14. As shown in FIG. 9, in an embodiment seven needles 40 per inch and fourteen courses 42 per inch are used in the stitching process.

Referring back to FIG. 8, in block 44 the face layer 18 is disposed over the barrier layer 14 after the stitching process has been completed. Thereafter, in block 46, a portion of the barrier layer 14 is melted to bond the face layer 18 to the barrier layer 14 and to fill a portion of the stitch holes 28 formed in the barrier layer during stitching.

In an embodiment, the barrier layer 14 is heated to or above about 140° C. (about 284° F.) to melt, for example, the adhesive 24 but not the intermediate material 26. In another embodiment, the barrier layer 14 is heated to between about 140° C. to about 180° C. (about 284° F. to about 356° F.) to melt, for example, the adhesive 24 but not the intermediate material 26. In yet another embodiment, the barrier layer 14 is heated to a temperature less than a set temperature of the interior layer 12 or the face layer 18, which may be about 360° C. (about 680° F.) or less depending on the materials used for those layers. In other embodiments, depending on the materials used the barrier layer 14 may be otherwise heated to a greater or lesser temperature.

Figure 10:
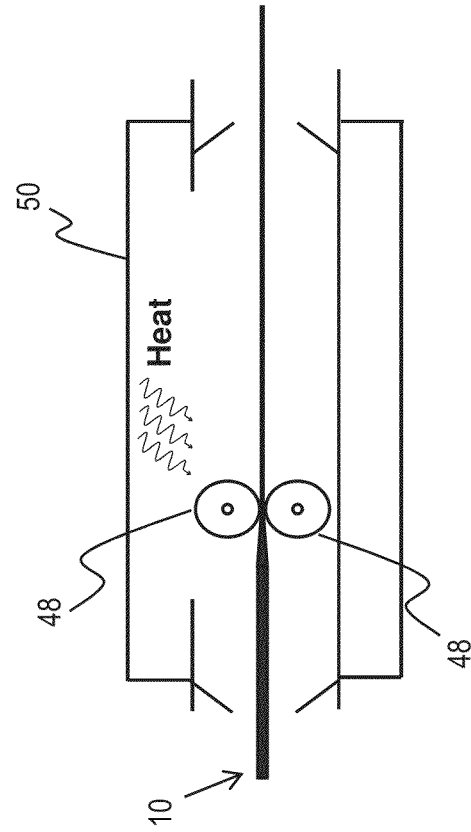
FIG. 10 is an embodiment of a heating device used to heat the barrier layer of the stitched multi-layer fabric of FIG. 1 in order to promote lamination.

Referring to FIG. 10, in an embodiment a portion of the barrier layer 14 is melted by feeding the fabric 10 through a pair of nip laminators 48 disposed in an oven 50. In an embodiment, the fabric 10 is moved through the oven 50 at approximately five yards per minute and at a temperature of approximately 180° C. (284° F.). The gap between opposing nip laminators 48 may be varied to subject the layers 12, 14, 18 to more or less pressure. Other settings and parameters may be used during the heating and/or melting process involving, for example, the nip laminators 48 and the oven 50.

In some embodiments, the fabric 10 or the individual layers 12, 14, 18 may undergo additional processing or treatment to impart desirable characteristics, qualities, or traits. For example, the interior and face layers 12, 18 or the fabric 10 may be dyed or treated with a fabric softener. In addition, an antimicrobial may also be sprayed onto the layers 12, 18 or the fabric 10. In addition, a finish that makes the layers 12, 18 or the fabric 10 water repellant or that encourages wicking may be applied.

Examples of illustrative embodiments are provided in the following paragraphs:

Example 1

In one example, the fabric 10 of FIG. 1 (with heat as Shown in FIG. 10) was constructed using a face layer 18 formed from woven wool face (57% wool/37% nylon/6% Spandex), a barrier layer 14 formed from a 3 mil urethane adhesive film (Stephens ST3995), and an interior layer 12 formed from wool pile (75.5% wool/24.5% black textured polyester). The yarn 16 was a 40 denier 13 black nylon air covered over 70 denier clear Spandex. The fabric 10 was heated to 180° C. and run through the oven at 5 meters per minute with a 2 mm gap/tunnel height.

The fabric 10 of FIG. 1 was tested under ASTM D-751 Procedure B Water Resistance and provided a result of 27.3 centimeters. In addition, the fabric 10 of FIG. 1 was tested under ASTM D-737 Air Perm and provided a result of 5.15 cubic feet per square foot per minute ($ft^3/ft^2/min$).

Example 2

In one example, the fabric 10 of FIG. 5 (with heat as Shown in FIG. 10) was constructed using a face layer 18 formed from woven wool face (57% wool/37% nylon/6% Spandex), a barrier layer 14 formed from a 3 mil urethane adhesive film (Stephens ST3995), and an interior layer 12 formed from wool pile (75.5% wool/24.5% black textured polyester). The yarn 16 was a 40 denier 13 black nylon air covered over 70 denier clear Spandex. The fabric 10 was heated to 180° C. and run through the oven at 5 meters per minute with a 2 mm gap/tunnel height.

The fabric 10 of FIG. 5 was tested under ASTM D-751 Procedure B Water Resistance and provided a result of 18.7 centimeters. In addition, the fabric 10 of FIG. 5 was tested under ASTM D-737 Air Perm and provided a result of 1.004 cubic feet per square foot per minute ($ft^3/ft^2/min$).

Example 3

In one example, the fabric 10 of FIG. 5 (without heat as Shown in FIG. 10) was constructed using a face layer 18 formed from woven wool face (57% wool/37% nylon/6% Spandex), a barrier layer 14 formed from a 3 mil urethane adhesive film (Stephens ST3995), and an interior layer 12 formed from wool pile (75.5% wool/24.5% black textured polyester). The yarn 16 was a 40 denier 13 black nylon air covered over 70 denier clear Spandex.

The fabric 10 of FIG. 5 was tested under ASTM D-751 Procedure B Water Resistance and provided a result of 15.2 centimeters. In addition, the fabric 10 of FIG. 5 was tested under ASTM D-737 Air Perm and provided a result of 3.47 cubic feet per square foot per minute ($ft^3/ft^2/min$).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of forming a stitched multi-layer fabric, comprising:
   stitching an interior layer to a barrier layer, the interior layer comprising a first non-waterproof fabric and the barrier layer configured to inhibit fluid flow;
   disposing a face layer over the barrier layer after the stitching, the face layer comprising a second non-waterproof fabric; and
   melting a portion of the barrier layer to bond the face layer to the barrier layer and to fill stitch holes formed in the barrier layer during the stitching.

2. The method of claim 1, further comprising forming the barrier layer from a first material with a first melting point and a second material with a second melting point, the first melting point lower than the second melting point.

3. The method of claim 2, further comprising utilizing an adhesive for the first material and a porous membrane for the second material.

4. The method of claim 2, further comprising utilizing an adhesive for the first material and a non-porous film for the second material.

5. The method of claim 2, further comprising forming the barrier layer from a third material, the third material and first material disposed on opposing sides of the second material and utilizing an adhesive with the first melting point for each of the first material and the third material.

6. The method of claim 1, further comprising utilizing one of an adhesive film and a polymer-based adhesive film for the barrier layer.

7. The method of claim 1, further comprising utilizing one of a non-contractible yarn, a contractible yarn, and a nylon-wrapped spandex for the stitching.

8. The method of claim 1, further comprising permitting each of the interior layer and the face layer to stretch in multiple directions.

9. The method of claim 1, further comprising utilizing at least one of a knitted, woven, and non-woven fabric for at least one of the first non-waterproof fabric and the second non-waterproof fabric.

10. A method of forming a stitched multi-layer fabric, comprising:
    stitching an interior layer to a barrier layer, the barrier layer formed from an adhesive and an intermediate material;
    disposing a face layer over the barrier layer after the stitching, the barrier layer configured to inhibit fluid flow; and
    heating the barrier layer to a temperature sufficient to melt the adhesive but not the intermediate material, a melted portion of the barrier layer bonding the face layer to the barrier layer and filling stitch holes formed in the barrier layer during the stitching.

11. The method of claim 10, further comprising heating the barrier layer to the temperature of at least 140° C.

12. The method of claim 10, further comprising heating the barrier layer to the temperature of between about 140° C. and about 180° C.

13. The method of claim 10, wherein the temperature is less than a set temperature of the interior layer and the face layer.

14. The method of claim 10, further comprising forming the interior layer from a first non-waterproof fabric and forming the face layer from a second non-waterproof fabric.

15. The method of claim 10, further comprising preventing the face layer from contacting the interior layer.

16. A method of forming a stitched multi-layer fabric, comprising:
    stitching an interior layer to a barrier layer, the barrier layer formed from an adhesive and an intermediate material;

disposing a face layer over the barrier layer after the stitching, the barrier layer configured to inhibit fluid flow; and melting the adhesive of the barrier layer to bond the face layer to the barrier layer and to fill stitch holes formed in the barrier layer during the stitching.

17. The method of claim 16, further comprising melting the adhesive of the barrier layer without melting the intermediate material of the barrier layer.

18. The method of claim 16, further comprising applying at least one of a dye, a fabric softener, an antimicrobial, and a water repellent to at least one of the interior layer, the barrier layer, and the face layer.

19. The method of claim 16, further comprising feeding the interior layer, the barrier layer, and the face layer through nip laminators in an oven at a predetermined rate and at a temperature lower than a set temperature of the interior layer and the face layer.

\* \* \* \* \*